July 25, 1950 C. G. MUNGER 2,516,242
METHOD OF LINING PIPES AND OTHER STRUCTURES
WITH PLASTIC SHEETS
Filed Dec. 11, 1944 2 Sheets-Sheet 1
CONCRETE PIPE
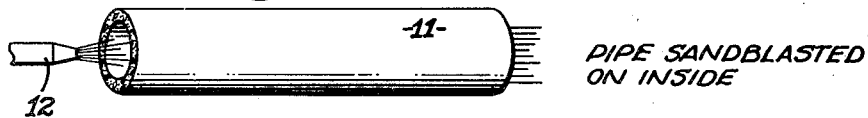
PIPE SANDBLASTED ON INSIDE
INSIDE COATED WITH ADHESIVE
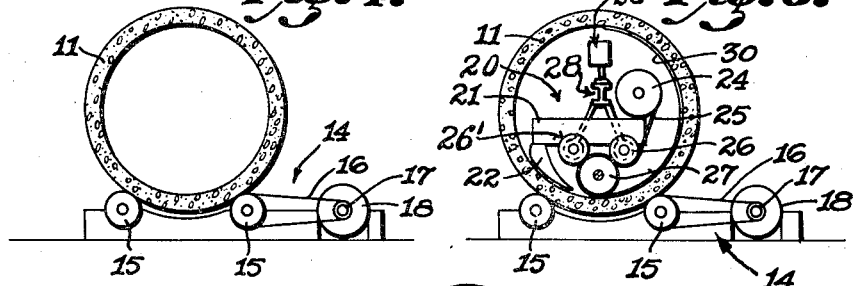
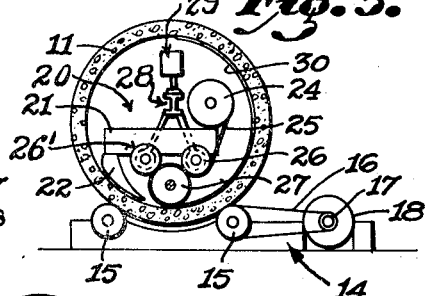
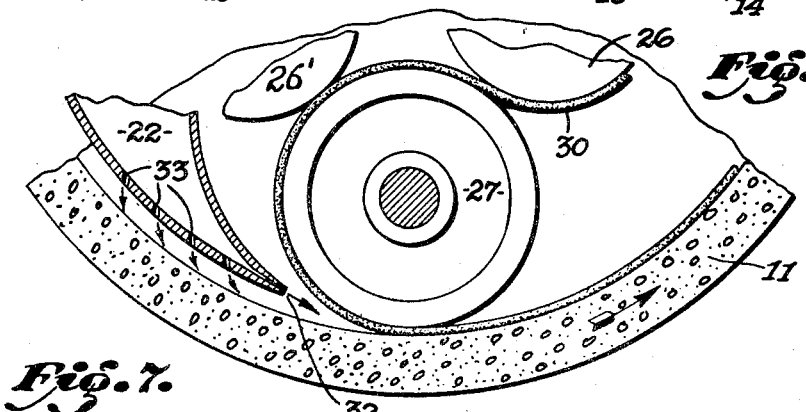
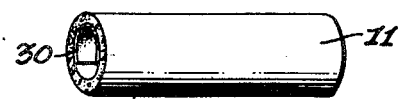
FINISHED PIPE WITH LINER
CHARLES G. MUNGER,
INVENTOR.
BY
ATTORNEY July 25, 1950                C. G. MUNGER                2,516,242
METHOD OF LINING PIPES AND OTHER STRUCTURES
WITH PLASTIC SHEETS Filed Dec. 11, 1944                                        2 Sheets—Sheet 2

CHARLES F. MUNGER,
INVENTOR.

BY *Frans Hanshaw*

ATTORNEY

Patented July 25, 1950

2,516,242

UNITED STATES PATENT OFFICE 2,516,242

METHOD OF LINING PIPES AND OTHER STRUCTURES WITH PLASTIC SHEETS

Charles G. Munger, San Gabriel, Calif., assignor, by mesne assignments, to Amercoat Corporation, South Gate, Calif., a corporation of California Application December 11, 1944, Serial No. 567,771

7 Claims. (Cl. 154—82)

This invention relates to the lining of various kinds of pipe, particularly concrete pipe and the like, with sheets of plastic material resistant to attack by acids and alkali.

Concrete pipe has been used extensively for conveying domestic sewage and industrial waste, especially where large capacity is required. When used for sewage disposal, one of the difficulties arises that considerable H2S gas is evolved, causing serious corrosion to any unlined concrete surfaces exposed to the action of such gases, resulting in deterioration of the concrete and eventual cracking of the pipe with resultant leakage.

While the pipe of the present invention is particularly useful for sewage lines it is not limited to such use inasmuch as it is practicable for use where protection from acids, alkalis and salts is required, such as waste water lines from refineries and chemical, paper, canning and food processing plants.

The lining itself is what is commonly referred to as plastic and is completely impervious to most chemical reagents and can be used whereever corrosive materials are encountered which would seriously affect ordinary concrete surfaces.

Attempts have been made to line concrete pipes with corrosive resistant material but such attempts have been generally unsuccessful in producing a commercial product due to the difficulty of effecting a uniform permanent bond between the lining and the concrete and effective joints between pipe segments.

It is the object of the present invention to provide a simple and economical method of lining pipe with a protective lining resistant to acids and alkalis which lining is composed of plastic sheets uniformly bonded to the inner surface of the pipe.

A further object of the present invention is to provide an economical method of placing a plastic sheet or sheets against the surface of a concrete pipe. The method herein described insures positive conformance of the resultant lining to whatever irregularities the concrete surface of the pipe may have; also insuring that no air will be entrapped between the lining and the concrete surface.

The plastics used for the liner of the pipe are preferably of the thermoplastic type and for the purpose of making the liner more impervious to water and chemicals, it is desirable that in making it the pigments or plasticizers be combined with the plastic as in well known practice. It is to be understood that the term "plastic" as used herein is intended to include all such materials as synthetic and natural resins, polymers and elastomers.

Other objects and advantages will appear hereinafter from the following description and drawings.

Referring to the drawings, which are for illustrative purposes only:

Fig. 1 is a perspective view of a section of a concrete pipe;

Fig. 2 illustrates the step of cleaning the inside surface of the pipe;

Fig. 3 is a perspective view of the pipe showing the coating of adhesive on the interior of the pipe;

Fig. 4 is an enlarged diagrammatic end view of the pipe shown in the preceding figures mounted upon a rotating machine for rotating the pipe;

Fig. 5 is a view similar to Fig. 4 showing the apparatus for applying a plastic sheet to the interior of the pipe;

Fig. 6 is an enlarged fragmentary view of a portion of the apparatus shown in Fig. 5;

Fig. 7 is a perspective view showing a section of the finished pipe with the plastic lining therein;

Figure 8:
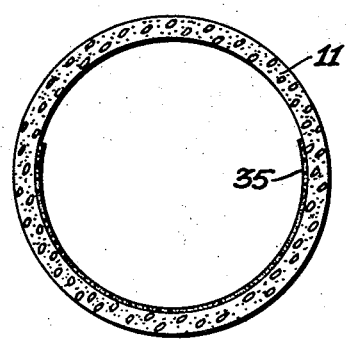
Fig. 8 is a diagrammatic end view of a section of pipe showing a plastic sheet therein illustrating a step in a modification of the method shown in the preceding figures.
Figure 9:
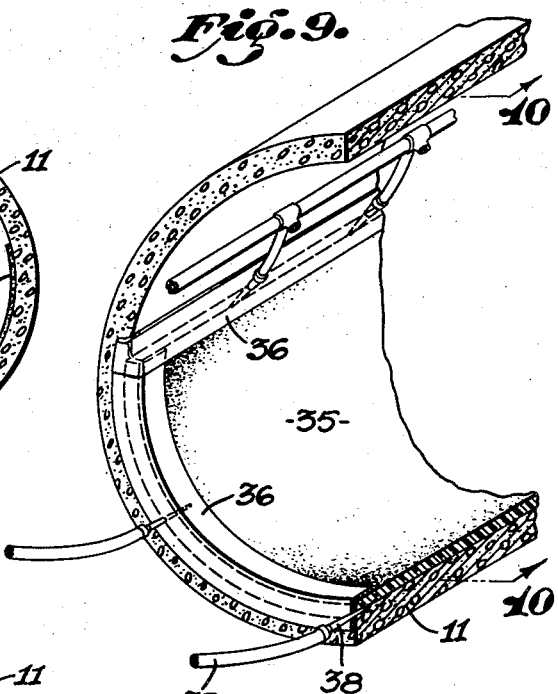
Fig. 9 is a fragmentary perspective view of the pipe shown in Fig. 8 showing the manner of taping the edges of the plastic sheet.
Figure 10:
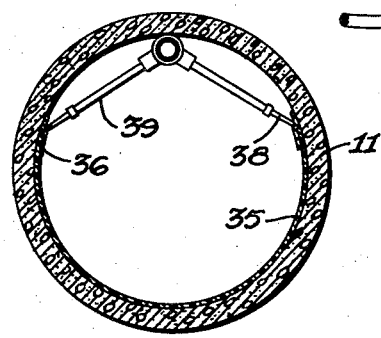
Fig. 10 is a sectional view on line 10—10, Fig. 9.

Referring more particularly to the method of my invention illustrated in Figs. 1 to 7 inclusive, a section of concrete pipe such as is diagrammatically illustrated at 11 in Fig. 1 is interiorly sandblasted or otherwise prepared by any suitable means, as for instance, by a nozzle indicated at 12 in Fig. 2, until the interior of the pipe is cleaned of all concrete latents or slurry.

After the surface preparation operation or step, the interior of the pipe is coated, as indicated at 13 in Fig. 3, with a resin adhesive, or the plastic sheet is coated, or both the inside of the pipe and the plastic sheet are coated, after which this coating of adhesive is permitted to dry, such drying operation, if desired, being accelerated by an airblast. After the coating has dried, which in some instances remains tacky, the pipe is placed upon a rotating machine generally indicated at 14 and diagrammatically illustrated in Fig. 4 wherein the rollers 15 of the rotating machine form a cradle support for the pipe, one of the rollers 15 being driven by a belt 16 from a pulley 17 driven by a motor or other motive power indicated at 18. After the pipe has been placed on the rotating machine a carriage generally indicated at 20 is introduced into the pipe. This carriage is provided with a casing indicated at 21 into which heated air from any suitable source is introduced and discharged therefrom through a nozzle shown at 22. Mounted on the carriage is a roller or drum 24 upon which is wound a plastic strip indicated at 25. This plastic strip is fed under a roller indicated at 26 and partially around a pneumatic roller indicated at 27 and under roller 26¹. The pneumatic roller 27 is made preferably with a rubber or yieldable surface, the interior of the roller being supplied with pressure so that the surface of the roller, while being slightly yieldable, is of sufficient rigidity to roll the plastic sheet into intimate contact with the interior surface of the pipe and the plastic adhesive thereon, the pneumatic roller throughout its length accommodating and conforming itself to the uneven surface of the interior of the pipe.

Pressure is preferably applied to the roller 27 through the medium of the rollers 26 and 26¹ which extend beyond the ends of the pipe and are connected to a longitudinal beam 28 which is pressed downwardly by a pneumatic or hydraulic ram diagrammatically illustrated at 29. The rollers 26 and 26¹ not only hold the plastic sheet against the roller 27 but press such roller downwardly against the sheet as it engages the pipe.

The plastic sheet indicated at 30 is pressed against the interior of the pipe as above described and as illustrated in Figs. 5 and 6, the pipe being turned on the rotating machine, thereby pulling the plastic sheet from the roll 24 under the rollers 26 and 26¹ partially around the roll 27 into contact with the pipe. As particularly illustrated in Fig. 6, the duct or nozzle 22 is provided with a discharge outlet 32 which is directed at the plastic sheet and interior of the pipe just before the point of contact and at the point of contact of the plastic sheet with the pipe.

The plastic sheet may be said to be adhered to the inside surface of the pipe in the presence of an adhesive, since the adhesive may be applied to either the pipe or sheet or to both.

In addition to this discharge outlet 32 a series of discharge outlets indicated at 33 are provided in the nozzle 22 to direct heated air against the inside face of the pipe as it approaches the meeting point of the plastic strip and the pipe. The surface temperature involved is such as sufficient to soften the adhesive and plastic to permit the bonding action. I have found that the temperature varies according to the particular plastic used but that a temperature of the nature of around 150° F. to 200° F. is sufficient. The pressure used in the roll 27 is approximately 50 lbs. per square inch. The pneumatic roll 27 makes a single pass over the surface of the plastic sheet and since by reason of the heating element above described both the plastic sheet and the pipe are heated and as the plastic sheet is of the thermoplastic resin type, the sheet takes the exact form of the inside pipe surface, following all irregularities and making a very tight, uniform bond over the entire surface of the pipe, all air having been removed from between the pipe and plastic sheet by the rolling action of the roller 27 as the pipe is rotated.

It is to be understood that the plastic sheet may be applied by the method just described to the entire interior surface of the pipe or it may be applied merely to that portion of the pipe which, as for instance when used for sewage disposal, is exposed to the gases above the liquid in the pipe. In other words, as illustrated in Fig. 7, the plastic sheet covers the upper portion of the pipe and extends downwardly beyond the center line of the pipe below the minimum flow level of the sewage or other liquids in the pipe.

While I have described the rotation of the concrete pipe as caused by driving one of the wheels 15, it is to be understood that other methods may be used as, for instance, any suitable means may be employed to drive one or both of the rollers 26 and 26¹.

As a modification of the method hereinabove described, after the interior of the pipe has been thoroughly prepared and is thoroughly dried the resin adhesive is then applied, not to the pipe surface but to the plastic sheet. This may be done in any well known manner of coating surfaces with adhesive. The interior surface of the pipe is then thoroughly wetted with acetone or some similar solvent, preferably of the type having the approximate boiling range and evaporation rate of acetone. This requirement is necessary to insure rapid evaporation of the solvent. The plastic sheet with the adhesive thereon is then heated either by hot air in a similar manner to that described in connection with the preferred method or by any other common heating method to a point where the adhesive becomes tacky. The sheet is then pressed in place by a pneumatic roller of the type above described utilizing a pressure of about 50 lbs. per square inch, the temperatures involved on the plastic sheet amounting to approximately from 150° to 200° F. Using this modified form of the method, the plastic sheet is tightly pressed against the surface of the concrete, making a thorough and uniform bond.

Another modification of my method of applying plastic sheets to the interior of concrete pipes is generally illustrated in Figs. 8 to 11 inclusive. In the method as first described above and the modification thereof just described, the pneumatic roller pressing against the plastic sheet with a rolling contact causes any air between the plastic sheet and the interior of the pipe to be removed and in this respect the modification of my method about to be described depends for the removal of air between the plastic sheet and the pipe by means of the creation of a vacuum in the space between the sheet and pipe with a consequent atmospheric pressure on the sheet which presses the sheet against the surface of the pipe without the requirement of any mechanical means for exerting pressure against the plastic sheet. To carry out this method of partially lined concrete pipe, as illustrated in Fig. 8, the pipe being indicated by the numeral 11 and the plastic lining by the numeral 35, to produce this pipe the plastic sheet is placed within the concrete pipe, the pipe having first been cleaned as heretofore described and a coating of adhesive having been applied either to the exterior of the sheet or the inside of the pipe. After the sheet is placed in the pipe the edges of the sheet are sealed by means of adhesive tapes illustrated at 36.

Figure 11:
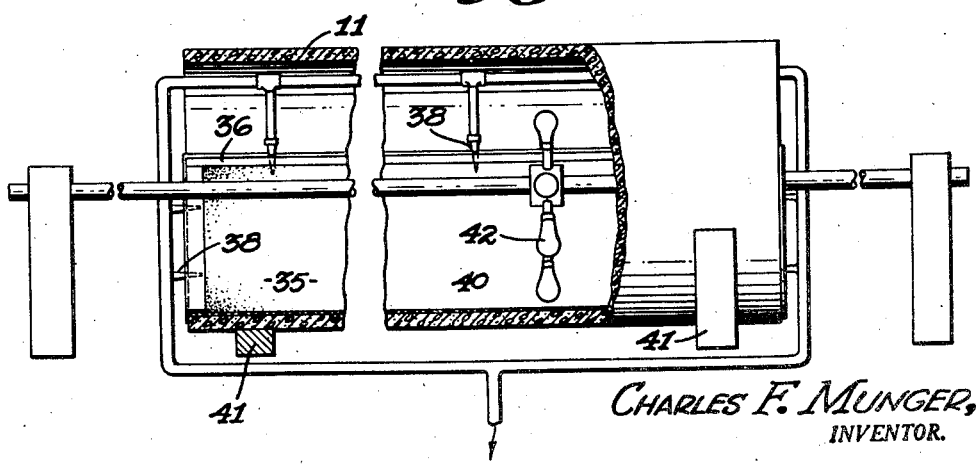
Fig. 11 is a longitudinal elevational view partly in section showing the heating unit in the pipe.

Introduced through these sheets and into the space between the plastic sheet and the pipe are a series of hollow needles indicated at 38, such needles being connected by suitable flexible connections 39 to a vacuum pump (not shown), the pump on being operated creates a vacuum between the sheet and the pipe with the result that the atmospheric pressure on the sheet presses the sheet into bonding engagement with the interior of the pipe. A heating element such as indicated at 40 in Fig. 11 is then passed through the pipe, the pipe being supported on a stationary cradle as indicated at 41. In the present instance this heating element 40 consists of a plurality of electric bulbs indicated at 42 of the infra-red type. As this heating element is passed through the pipe the bonding operation is completed so that complete bond is made between the sheet and the pipe.

To protect the pipe joints a plastic sheet may be applied at the joints after the pipe is in place by means similar to those hereinabove described so that when finished the pipe line is lined complete with an unbroken sheet of inert plastic material.

While I have illustrated and described a specific method of producing a plastic lined concrete pipe, it is to be understood that I do not limit my invention to the particular details shown and described but intend to cover such modifications as come within the appended claims.

I claim as my invention:

1. The method of lining pipe with plastic sheets which comprises: cleaning the inside surface of a pipe; coating the inside of the pipe with an adhesive; rotating the pipe; feeding a plastic sheet to the inside of the pipe; rolling the plastic sheet under pressure with a cylindrical yieldable surfaced roller having pneumatic pressure therein throughout its length against the inside of the pipe and applying heat to the plastic sheet and to the pipe at the area of rolling contact of the sheet with the pipe.

2. The method of lining pipe with plastic sheets which comprises: preparing the inside surface of the pipe; coating one side of a plastic sheet with an adhesive; wetting the inside surface of the pipe with a solvent; rolling the plastic sheet under pressure against the inside of the pipe and applying heat to the plastic sheet and to the pipe at the area of rolling contact of the sheet with the pipe.

3. The method of lining pipe with plastic sheets which comprises: preparing the inside surface of the pipe; coating both the pipe and plastic sheet with adhesive; wetting the adhesive surfaces with solvent; rolling the plastic sheet under uniform pressure against the inside of the pipe and applying heat to the plastic sheet and to the pipe at the area of rolling contact of the sheet with the pipe.

4. The method of lining a pipe member with a plastic sheet member which comprises applying an adhesive to one of said members, simultaneously rotating the pipe member, applying under pressure a plastic sheet member to the inside surface of the pipe member, and applying heat locally to the sheet member and inside surface of the pipe member at the immediate area of first contact of the sheet member with the pipe member.

5. The method of lining a pipe member with a plastic sheet member which comprises applying an adhesive to one of said members, simultaneously rotating the pipe member, applying under pressure a plastic sheet member to the inside surface of the pipe member, and directing a stream of hot air between the sheet member and inside surface of the pipe member immediately ahead of first contact of the sheet member with said surface.

6. The method of lining a pipe member with a plastic sheet member by the use of a roller which consists of applying an adhesive to one of said members, placing the roller axially in the pipe member and pressing it radially against the inside surface of the pipe member while simultaneously rotating the pipe member, feeding a sheet member of plastic material from the roller onto the inside surface of the pipe member and applying heat locally to the inside surface of the pipe member and the sheet member at the area of rolling contact of the sheet member with the pipe member.

7. The method of lining a structure having a surface to be covered with a plastic sheet which comprises providing an adhesive between the plastic sheet and said surface, feeding the plastic sheet to said surface and rolling the sheet onto said surface under pressure throughout the length of the sheet with a cylindrical yieldable roller while simultaneously applying heat to said surface and plastic sheet locally at the area of rolling contact of the sheet with the surface.

CHARLES G. MUNGER.

REFERENCES CITED

The following references are of record in the file of this patent:

UNITED STATES PATENTS

| Number | Name | Date |
| --- | --- | --- |
| 1,648,475 | Darwin | Nov. 8, 1927 |
| 2,027,961 | Currie | Jan. 14, 1936 |
| 2,228,332 | Wick et al. | Jan. 14, 1941 |
| 2,343,225 | Pray | Feb. 29, 1945 |
| 2,372,737 | Phillips | Apr. 3, 1945 |